(12) United States Patent
Wheel

(10) Patent No.: US 6,714,286 B1
(45) Date of Patent: Mar. 30, 2004

(54) AGILE PSEUDO-NOISE CODED RANGING LADAR

(75) Inventor: Peter J. Wheel, Fort Wayne, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/313,841

(22) Filed: Dec. 6, 2002

(51) Int. Cl.[7] .............................. G01C 3/08; G01S 13/00
(52) U.S. Cl. ...................... 356/5.05; 356/5.09; 342/128; 342/145; 342/189; 342/203
(58) Field of Search ............................ 356/4.01–5.15; 343/127, 128, 145, 189, 203

(56) References Cited

U.S. PATENT DOCUMENTS

| | | |
|---|---|---|
| 3,614,719 A | 10/1971 | Treacy |
| 4,005,420 A | 1/1977 | McDonald |
| 4,023,026 A | 5/1977 | O'Farrell |
| 4,042,925 A | 8/1977 | Albanese et al. |
| 4,622,555 A | 11/1986 | Doggett et al. |
| 4,679,048 A | 7/1987 | Brandsetter et al. |
| 4,901,082 A | 2/1990 | Schreiber et al. |
| 4,906,069 A | 3/1990 | Brandstetter et al. |
| 5,069,545 A | 12/1991 | Hinz |
| 5,241,315 A | 8/1993 | Spinhirne |
| 5,497,160 A | 3/1996 | Koehler et al. |
| 5,574,553 A | 11/1996 | McManamon et al. |
| 5,847,817 A | 12/1998 | Zediker et al. |
| 5,898,401 A | 4/1999 | Walls |
| 5,959,571 A * | 9/1999 | Aoyagi et al. ................ 342/70 |
| 5,999,119 A | 12/1999 | Carnes et al. |
| 6,044,336 A | 3/2000 | Marmarelis et al. |
| 6,208,632 B1 * | 3/2001 | Kowalski et al. |
| 6,236,352 B1 | 5/2001 | Walmsley |
| 6,271,786 B1 | 8/2001 | Huff et al. |
| 6,618,125 B2 * | 9/2003 | Stann ........................ 356/5.09 |
| 2002/0048012 A1 | 4/2002 | Stann |

FOREIGN PATENT DOCUMENTS

| | | |
|---|---|---|
| EP | 0 392 172 A2 | 10/1990 |
| JP | 9-26477 | 1/1997 |
| JP | 2000-275340 | 10/2000 |

* cited by examiner

Primary Examiner—Stephen C. Buczinski
(74) Attorney, Agent, or Firm—RatnerPrestia

(57) ABSTRACT

An apparatus and method of dynamically optimizing an acquisition range of a radar system, including modulating a CW radar signal with a PN code that has an adjustable code frequency of modulation and an adjustable chip length. The method includes transmitting the modulated radar signal and receiving a return radar signal, based on the transmitted radar signal. The method continuously measures a SNR of the received return radar signal, and adaptively tunes the adjustable code frequency of modulation, and adaptively tunes the adjustable chip length, based on the continuously measured SNR. In this manner, the acquisition range of the radar system is optimized.

28 Claims, 4 Drawing Sheets

AGILE PSEUDO-NOISE CODED RANGING LADAR

TECHNICAL FIELD

This invention relates, in general, to a radar system and, more specifically, to a ladar (laser radar) system having an adjustable, pseudo-noise (PN) coded transmitted signal that is adaptively tuneable to optimize target acquisition.

BACKGROUND OF THE INVENTION

Laser radar, optical radar and ladar are all names used for radar systems utilizing electromagnetic radiation at optical frequencies. The radiation used by a ladar system is at wavelengths which are 10,000 to 100,000 times shorter than that used by a microwave radar system. Radiation scattered by the target of interest is collected and processed to yield information about the target and range to the target. Early conventional radar and ladar systems observed the intensity of the collected radiation and the time delay from transmission to collection.

Ladar systems may be classified as continuous-wave (CW) or pulsed, as well as focused or collimated. CW ladar systems are generally used when the signal may be integrated over long time periods and/or when the target of interest is nearby. Focusing is mainly performed using CW ladar systems to permit them to make a more sensitive measurement over a smaller span of ranges. In contrast, pulsed ladar systems use much higher peak power levels during the laser pulse than can be maintained with a CW laser, producing higher signal-to-noise ratios for the collected radiation. Pulsed ladar systems are usually chosen for long-range remote sensing and when signal integration over a long time period is impractical.

A ladar system transmits light to a target of interest, the transmitted light interacts with and is changed by the target, and some of this light is reflected/scattered back (returned) to the ladar system where it can be analyzed. For example, the round trip time required for the light to travel to the target of interest and back to the ladar system is used to determine the range to the target.

As known in the art, CW radar systems have been used to acquire a target and measure range to the target. One such system, disclosed in U.S. Pat. No. 5,999,119, issued to Carnes et al. on Dec. 7, 1999, includes changing the phase of a transmitted CW signal by 180 degrees, in accordance with a binary, PN code. A code of N bits, for example, is stored in a re-circulating shift register memory. The bits are read out from memory at a predetermined rate, $f_s$, and fed to a bi-phase modulator along with the CW signal. The phase of the CW signal changes 180 degrees in response to a logic 1 bit and remains unchanged in response to a logic 0 bit. The coded CW signal is transmitted through a transmit antenna. Radar returns from a target are received by a receive antenna. The received CW radar returns have the same code as the transmitted code; however, the received code pattern is time delayed with respect to the transmitted code, by an amount related to the target range. As the target radar returns are correlated with different time delayed replicas of the PN code, target range may be determined.

Another radar system, disclosed in U.S. Pat. No. 6,236,352, issued to Walmsley on May 22, 2001, includes an intermediate frequency (IF) signal used to modulate and demodulate transmitted and received signals, respectively. The IF signal is modulated by a PN coded sequence that has a predetermined number of digital bits. The patent discloses various embodiments, each having a PN coded sequence of different number of bits in length. For example, a PN sequence of one embodiment has 12-bits in length. Another embodiment has 32-bits in length, and yet another has 8-bits in length. The patent does not describe an embodiment having an adaptively tuneable PN sequence, in which the bit length may be adjustable to optimize a received signal to noise ratio (SNR) or acquisition range to a target.

This invention addresses a radar system and a ladar system each including an adjustable, PN coded transmitted signal that is adaptively tuneable to optimize the received SNR, target acquisition range and resolution.

SUMMARY OF THE INVENTION

To meet this and other needs, and in view of its purposes, the present invention provides a radar system for acquiring a target including a waveform generator for generating a programmable pseudo-noise (PN) code of a variable code modulation frequency and a variable chip length. Also included are a transmitter for transmitting a continuous wave (CW) radar signal modulated in accordance with the programmable PN code, a receiver adapted to receive a radar return based on the transmitted radar signal, and a processor for processing the received radar return and acquiring the target. The processor includes a first tuning control signal provided to the waveform generator for adjusting the code modulation frequency, and a second tuning control signal provided to the waveform generator for adjusting the chip length, whereby the waveform generator adjusts the code modulation frequency and the chip length, in response to the first and second tuning control signals, to optimize target acquisition.

In an embodiment of the invention, the transmitter includes a laser diode for transmitting a light signal, the light signal modulated in accordance with the programmable PN code, and the receiver includes optics for receiving the light signal.

In one embodiment, the chip length of the programmable PN code varies from a 32 bit sequence to a 1024 bit sequence, and the code modulation frequency varies from 1 MHz to 1024 MHz.

The processor, during a first time period, provides the first tuning control signal to the waveform generator for adjusting the code modulation frequency, and during a second time period, provides the second tuning control signal to the waveform generator for adjusting the chip length, whereby the first time period occurs prior to the second time period.

In another embodiment, the invention includes a ladar system for acquiring an image of a target. The ladar system has a waveform generator for generating a programmable pseudo-noise (PN) code of a variable code modulation frequency and a variable chip length, an optical transmitter for transmitting a continuous wave (CW) laser signal modulated in accordance with the programmable PN code, an optical receiver adapted to receive an image of the target based on the transmitted laser signal, and a processor for processing the received image of the target. The processor includes a first tuning control signal provided to the waveform generator for adjusting the code modulation frequency, and a second tuning control signal provided to the waveform generator for adjusting the chip length, whereby the waveform generator adjusts the code modulation frequency and the chip length, in response to the first and second tuning control signals, to optimize the received image of the target.

The invention also includes a method of dynamically optimizing an acquisition range of a radar system. The method modulates a CW radar signal with a PN code that has an adjustable code frequency of modulation and an adjustable chip length. The method also includes transmitting the modulated radar signal and receiving a return radar signal based on the transmitted radar signal. The method continuously measures a SNR of the received return radar signal and adaptively tunes the adjustable code frequency of modulation, and adaptively tunes the adjustable chip length, based on the continuously measured SNR. In this manner, the acquisition range of the radar system is optimized.

The method further includes determining if the code frequency of modulation is at a minimum value, and increasing the chip length, if the code frequency of modulation is at a minimum value.

The method further determines if the code frequency of modulation is at a maximum value, and decreases the chip length, if the code frequency of modulation is at a maximum value.

In yet another embodiment, the invention includes a ladar system for acquiring an image of a target. The ladar system has a waveform generator for generating a programmable pseudo-noise (PN) code of a variable code modulation frequency and a variable chip length, an optical transmitter for transmitting a continuous wave (CW) laser signal modulated in accordance with the programmable PN code, an optical receiver adapted to receive an image of the target based on the transmitted laser signal, and a processor for processing the received image of the target. The optical receiver includes a silicon detector array for dividing the image into a number of pixels. The received signal from each pixel is processed by autocorrelation of the received PN code to determine a time delay of the signal at a respective pixel. From the time delay, the distance to the corresponding point on the target is calculated. This pixel by pixel distance information is then used to derive the depth dimension of the target allowing improved target recognition. The processor includes a first tuning control signal provided to the waveform generator for adjusting the code modulation frequency, and a second tuning control signal provided to the waveform generator for adjusting the chip length, whereby the waveform generator adjusts the code modulation frequency and the chip length, in response to the first and second tuning control signals, to optimize the received image of the target.

It is understood that the foregoing general description and the following detailed description are exemplary, but are not restrictive, of the invention.

BRIEF DESCRIPTION OF THE DRAWINGS

The invention is best understood from the following detailed description when read in connection with the accompanying drawing. Included in the drawing are the following figures.

DETAILED DESCRIPTION OF THE INVENTION

A ladar system according to the present invention advantageously tunes the code modulation frequency and chip length of an agile PN coded transmitted signal, so that the received signal may be optimized for target acquisition over a wide dynamic range. The agile PN code balances acquisition range, range resolution and update time in a single system.

A ladar system (or a radar system) using this agile PN code may acquire a fast moving target at a distant range, as well as a slow moving target at a close range. For example, two outer space missions representing extreme differences in closing velocities and required ranges of operation may use the same ladar system (or radar system). One such mission, for example, may be an interplanetary asteroid flyby mission and the other mission, for example, may be a docking maneuver. These two missions represent extreme differences in closing velocities and required ranges of operation. The asteroid flyby mission may need to acquire the asteroid at hundreds of kilometers and may get no closer than thousands of meters. The closing velocity may be in the range of several kilometers per second. On the other extreme, the docking mission may not need to acquire a target (space station) much beyond thousands of meters in a low closing velocity of several centimeters per second. By advantageously tuning the modulation frequency and chip length of the agile PN coded transmitted signal, in accordance with the present invention, the ladar system (or radar system) may satisfy these mission extremes with a single system.

Figure 1:
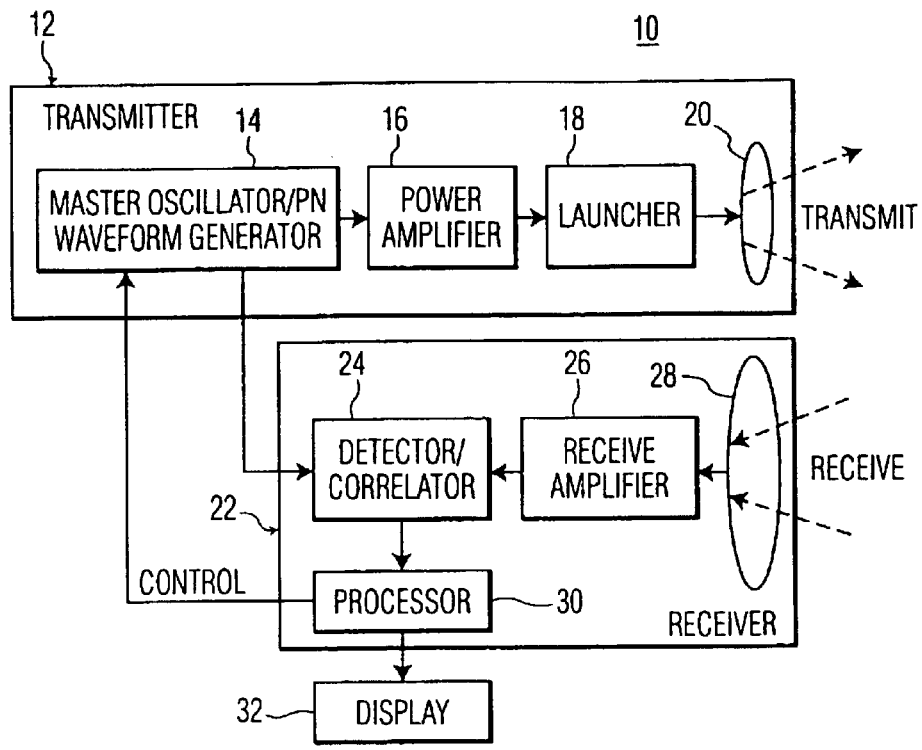
FIG. 1 is a block diagram of a ladar system in accordance with an embodiment of the invention.

A ladar system, generally designated as 10, is shown in FIG. 1. As will be explained, the ladar system includes an agile PN code that may be programmable by tuning the code modulation frequency and code word size (or chip length). The programming, or tuning, may be executed in real time based on actual target conditions.

As shown, ladar system 10 includes transmitter 12 and receiver 22. The transmitter illuminates a target under investigation with a programmable PN bit pattern. Laser light, used as the frequency carrier, is digitally modulated with coded bit patterns of variable length. Energy returned from the target is collected by the receiver, detected and processed to obtain range. Display 32 may be used to display range to the target.

As shown, transmitter 12 includes master oscillator/PN waveform generator 14, power amplifier 16, launcher 18 and optical lens 20. Receiver 22 includes optical lens 28, amplifier 26, detector/correlator 24 and signal processor 30. In transmitter 12, master oscillator/PN waveform generator 14 may include a continuous wave (CW) laser operating at a 1.55 micron wavelength, which is eye-safe. The laser source may be a distributed feedback (DFB) laser diode that is modulated by a programmable PN code generator.

Figure 2:
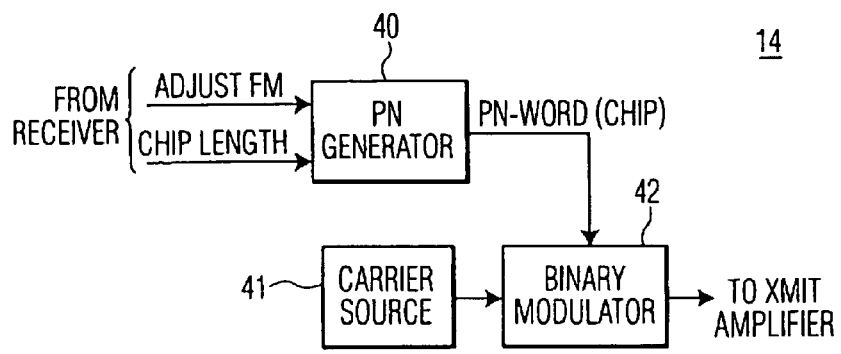
FIG. 2 is a block diagram of a master oscillator/PN waveform generator of the ladar system shown in FIG. 1, in accordance with an embodiment of the invention.

As best shown in FIG. 2, programmable PN code generator 40 is coupled to modulator 42. The binary modulator, which may be an on/off modulator or a bi-phase modulator, receives a PN word or chip, corresponding to a pseudo-random sequence of ones and zeros from PN generator 40.

In general, the pseudo-random sequence may be generated by digital techniques to produce a coded word. The coded word may be produced repetitively, without hiatus, between the end of one word and the beginning of the next word.

Carrier source 41, which may be a CW laser signal operating at an optical frequency (or a CW radar signal operating at a microwave frequency), is modulated by modulator 42 to produce the agile PN coded transmitted signal. The bits of the PN word are transmitted at a bit rate of $f_m$, the code modulation frequency, or the rate at which the phase of the transmitted signal is bi-phase or binary encoded.

In accordance with an embodiment of the invention, PN generator 40 may receive control signals from processor 30 of receiver 22 (FIG. 1). The control signals may include two separate tuning commands to adjust the code modulation frequency, $f_m$, and the chip length, or the number of bits in a PN word (FIG. 2).

Continuing the description of FIG. 1, power amplifier 16 may be a coherent array of optical fiber amplifiers, collectively forming a fiber optic power amplifier. The optical fiber may be an optical fiber having a core doped with one of more rare earth elements, such as an erbium doped fiber amplifier (EDFA) which amplifies the laser energy. The output of the EDFA may be coupled to transmitter optics (launcher 18 and lens 20) that produces the desired far field energy distribution.

The transmitter optics may be an optical lens (as shown), although a mirror, or an array of fibers in a phased array may also be used. The transmitter optics collimates the high power signal from the fiber optic power amplifier and directs the collimated transmit laser beam towards a distant target. The transmitter optics may be gimbal mounted, so as to permit the transmitted laser beam to sweep a target in accordance with a predetermined sweep pattern. Coverage of the target may occur several ways. For example, a fan beam, spot beam or flood beam may be used.

The receiver optics may be the same optics as the transmitter optics. Receive lens 28 may collect back scattered light from a target and couple the light into receive amplifier 26, which may be a single mode diode pumped fiber optic preamplifier. For ease of explanation, the transmitter optics and the receiver optics are shown separately in FIG. 1. The function of receive amplifier 26 is to amplify the received signal to a higher, more convenient optical signal level and to enhance the signal to noise ratio (SNR) of the receiver.

Detector/correlator 24 may include a photo-detector, such as an avalanche photo diode (APD) operating in the linear or Geiger mode. Two dimensional (2D) format arrays may be used consisting of 256×256 elements, for example. An APD 2D array may provide moderate gain at modest voltage levels and may have low noise. This structure may have an added benefit of not having sharp edges or corners that produce high potential fields resulting in failure from electrical breakdown. Each pixel of the array may further be processed by a push broom or starring system technique for obtaining a three dimensional (3D) image.

The detector/correlator, as shown, receives the output of the digital PN code, which is generated by master oscillator/PN waveform generator 14, and the received optical signal, which includes a delayed version of the same digital PN code. The detector finds the product of these two signals. If the two PN codes arrive at the detector in unison, the output level is high. If the PN code sequence does not arrive at the detector input in synchronism, the magnitude of the detector output is low.

An auto correlation of the PN code sequence may be generated by delaying the PN code received from the waveform generator with respect to the PN coded waveform received from the target, then multiplying and integrating the two PN codes. When the two PN codes are aligned in time (or range), i.e. bit 1 with bit 1, bit 2 with bit 2, etc., throughout the code, the integrator output is at a maximum value. When the integrator output is at a maximum value, a conclusion may be drawn that the time required for the ladar signal to transverse the distance to a target and return is equal to the delay time in the delay unit. Range to the target may be calculated from the delay time.

Continuing the description of FIG. 1, processor 30, which may include the auto correlation function described above, provides control signals to master oscillator/PN waveform generator 14. These control signals, as shown in FIG. 2, are adjustment of the code modulation frequency, $f_m$, and the code word length (or chip length). As will be explained, processor 30 executes an algorithm that measures the SNR of the received signal, compares the SNR to a threshold value, and provides adjustment controls to the transmitter for adaptively tuning the code modulation frequency and the chip length produced by the PN waveform generator.

Figure 3:
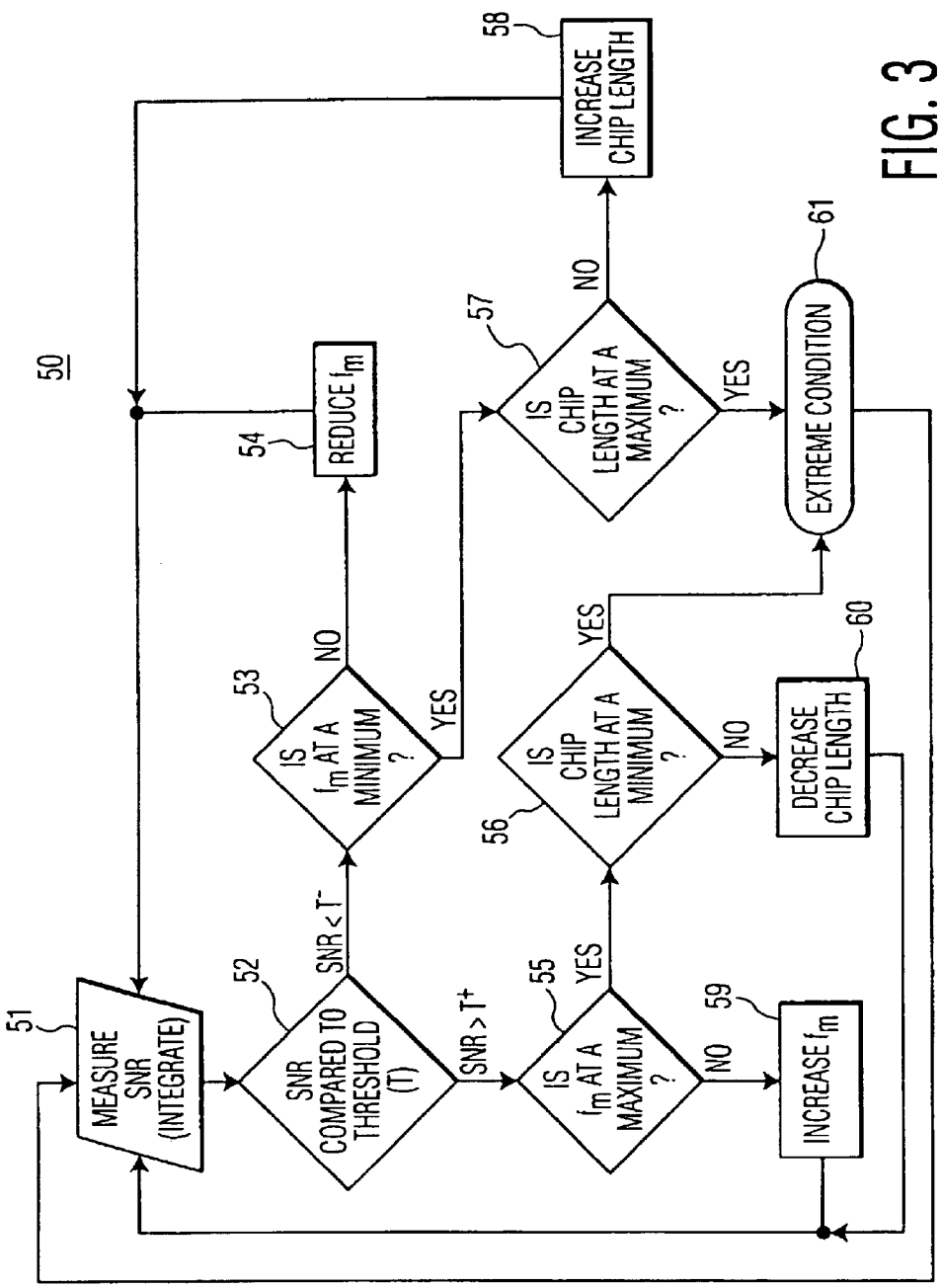
FIG. 3 is a flow diagram of a method executed by a radar system and/or the ladar system shown in FIG. 1, in accordance with an embodiment of the invention.

Referring now to FIG. 3, there is shown a method of the invention, generally designated as 50, which may be executed in processor 30, in accordance with an embodiment of the invention. Starting at step 51, the method measures the SNR of the received signal. The SNR is determined by measuring the SNR per bit (or pulse), and then integrating the measured SNR per bit over the chip length. This is the chip SNR. A predetermined number of chip SNR measurements (for example 10 chips) are then averaged to obtain the averaged SNR over the predetermined number of consecutive chips.

The signal per bit ($S_B$) may be obtained by using the following equation:

$$S_B = E \cdot \frac{P}{\pi} \cdot \eta_{ch} \cdot \Omega_{IFOV} \cdot A_{opt} \cdot T_{opt} \cdot \eta_d \cdot \frac{\lambda}{hc} \cdot \frac{1}{2 \cdot f_m}$$

Where:

$S_B$=Signal per Bit

E=Irradiance on surface $$E = P \cdot \eta_{ch} \cdot \frac{1}{\Omega_T \cdot R^2}$$

P=Transmitter output laser power $\eta_{ch}$—channel transmission $\Omega_T$—Transmitted beam width [sr]

R—Range from ladar system to target or object

ρ—object reflectivity $\Omega_{IFOV}$—IFOV [sr]=Ad/EFL$^2$ $A_{opt}$—Area of the receiver aperture $T_{opt}$—Receiver optical transmission $\eta_d$—APD gain, QE, and fill factor $f_m$—PN code modulation frequency From the above equation, it may be seen that the signal is inversely proportional to the code modulation frequency, $f_m$.

The noise (N) is given by the following equation:

$$Noise = \sqrt{\left(S_B + id \cdot \frac{1}{q} \cdot \frac{1}{f_m}\right)}$$

where:
id=detector dark current
q=1.6·10$^{-19}$ coulombs/electron (elementary charge) and the SNR, per bit, is:

$$SNR = \left[\left(\frac{N}{S_B}\right)^2 + \frac{1}{S_B} + \frac{1}{M_{speckle}}\right]^{-1/2}$$

To avoid oscillation due to measurement dynamics, the SNR per bit may be integrated over the chip length and the average SNR may be calculated over the chip length. This is the chip SNR. Speckle in the above equation may be ignored.

For a 1 MHz modulation frequency and a 1024 bit chip length, the integration time for computing one chip SNR is 1 msec. In an embodiment of the invention, 1 MHz modulation frequency is the slowest code modulation frequency and 1024 bit chip length is the longest chip length. These two values likely represent an extreme condition in which acquisition range may be at a maximum.

A predetermined number of consecutive chip SNR measurements may be averaged (for example, 10 consecutive chip SNR measurements) and the result may be compared to a threshold value in step 52. It will be appreciated that other number of consecutive chip SNR measurements may be used for obtaining the average value.

Figure 4:
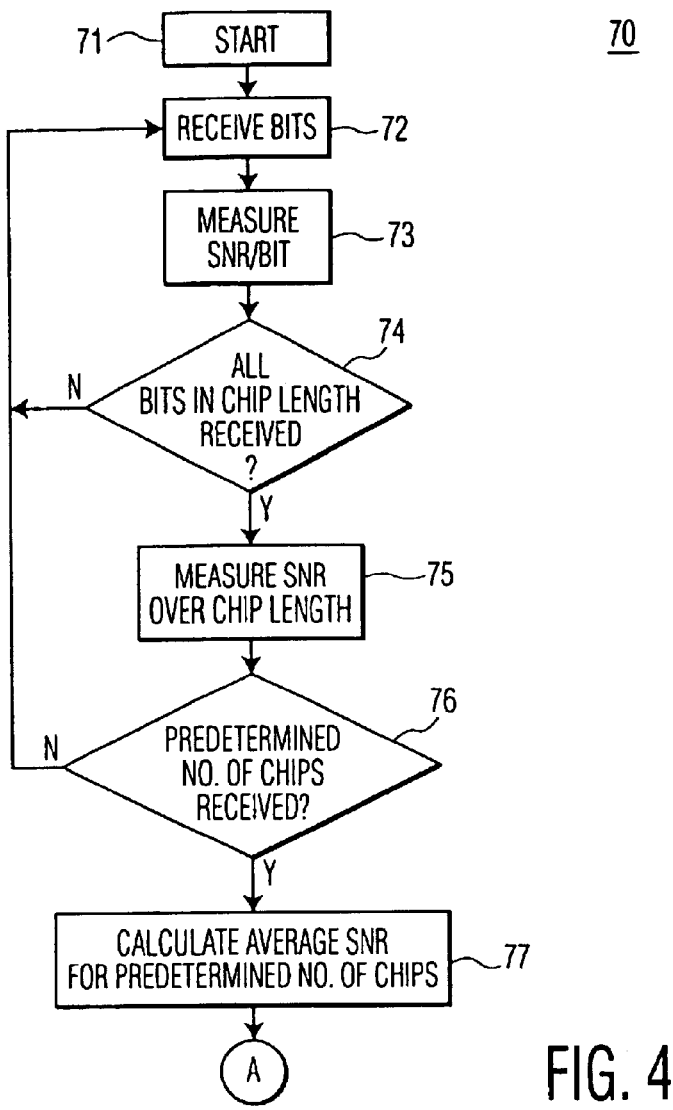
FIG. 4 is a flow diagram of a method of averaging SNR of bits received by a radar system and/or the ladar system shown in FIG. 1, in accordance with an embodiment of the invention.

A method of measuring SNR in accordance with an embodiment of the invention is illustrated in FIG. 4, and is generally designated as 70. As shown, the method receives the PN coded bits detected in the receiver (steps 71 and 72). The SNR per bit is measured (step 73). The method next determines whether all the bits in the PN coded word (chip) have been received and measured (decision box 74). If all the bits in the word (chip) have not been received and measured, the method branches to step 72 and continues measuring the SNR of each bit. After all the bits in the word (adjustable size) have been received, the method branches to step 75 and measures the chip SNR.

The method next enters decision box 76 and determines whether a predetermined number of chips have been received (the number of chips may be adjusted in the method). If the predetermined number of chips have not been received, the method branches to step 72 and continues calculating each consecutive chip SNR. After the predetermined number of chip SNRs have been calculated, the method branches to step 77 and calculates the average SNR for the predetermined number of chips.

Returning to the description of FIG. 3, after calculating the average SNR over a consecutive number of chips (step 51), the method enters step 52 and compares the average SNR to a threshold value. The manner in which the threshold value is calculated is explained below.

The variance of the predetermined number of consecutive chip SNRs is σ$^2$ (SNR). The σ (SNR), which is the square root of the variance, is used to compute a threshold dead band (a range between T$^-$ and T$^+$).

The threshold may be set such that for each SNR event (single bit) that exceeds the threshold level, a trigger is recorded and the event is said to have occurred. For SNR events below threshold, no trigger is recorded and the event is said to be absent.

The SNR and threshold levels determine the probability of detection (Pd). The SNR may be measured and the threshold may be set by the method or algorithm. The equation relating these parameters is as follows:

$$Pd = \frac{1}{2} \cdot \left[1 + erf\left[\frac{(SNR - TNR)}{2}\right]\right]$$

The threshold to noise ratio (TNR) may be a function of laser pulse width (one bit width, Δt) and false alarm rate (FAR). The FAR may be set according to the user's needs. The TNR may be defined as follows:

$$TNR = -2 \cdot ln(2 \cdot \sqrt{\sqrt{3} \cdot \Delta t \cdot FAR})$$

where:

$T^- = TNR - \sigma(SNR)$, and $T^+ = TNR + \sigma(SNR)$

In an embodiment of the invention, when the SNR is within ±σ of the threshold (the dead band), no adjustment to code modulation frequency or chip length occurs.

Figure 5:
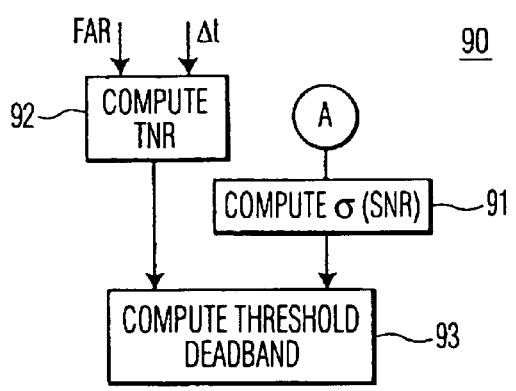
FIG. 5 is a flow diagram of a method of computing a threshold dead band in a radar system and/or the ladar system shown in FIG. 1, in accordance with an embodiment of the invention.

Referring to FIG. 5, there is shown a method, generally designated as 90, for computing the threshold dead band. After calculating the average SNR over a predetermined number of consecutive chips (step 77 in FIG. 4), the method computes σ(SNR), which is the square root of the variance (step 91). Step 92 computes TNR based on the false alarm rate (which may be adjustable) and the bit pulse width (Δt), which is a function of the code modulation frequency and the chip length (both adjustable). Step 93 then computes the threshold dead band based on the equations given above.

Returning to the description of FIG. 3, decision box 52 compares the SNR to the threshold (T$^-$ and T$^+$). So long as the SNR is within ±σ of the threshold, no adjustment is made to the code modulation frequency or chip length.

If the SNR is less than T$^-$, the method branches to decision box 53 and determines if the code modulation frequency ($f_m$) is at a minimum value. If it is not at a minimum value, the method branches to step 54 and reduces $f_m$. After reducing $f_m$, the method returns to step 51 to calculate the average SNR over the next predetermined number of chips (with the reduced $f_m$ value). If decision box 53 determines that $f_m$ is at a minimum value, the method branches to decision box 57.

If the chip length is at a maximum value, the method branches to step 61 and may alert the operator of an extreme operating condition ($f_m$ at a minimum and chip length at a maximum). The method then branches back to step 51. If the chip length is not at a maximum value, however, the method branches to step 58 and increases the chip length. After increasing the chip length, the method returns to step 51 and computes a new SNR value.

Returning to decision box 52, if the SNR value is greater than T$^+$, the method branches to decision box 55 and determines if the code modulation frequency ($f_m$) is at a maximum value. If it is not at a maximum value, the method branches to step 59 and increases $f_m$. After increasing $f_m$, the method returns to step 51 to calculate the average SNR value over the next predetermined number of chips (with the increased $f_m$ value). If decision box 55 determines that $f_m$ is at a maximum value, the method branches to decision box 56.

If the chip length is at a minimum value, the method branches to step 61 and may alert the operator of an extreme operating condition ($f_m$ at a minimum) and may then branch back to step 51. If the chip length is not at a minimum value, however, the method branches to step 60 and decreases the chip length. After decreasing the chip length, the method returns to step 51 and computes a new SNR value.

In an embodiment of the invention, the upper $f_m$ limit may be set to a value of 1 GHz (1024 MHz) and the lower $f_m$ limit may be set to a value of 1.0 MHz. It will be appreciated that these limits are not absolute limits and other $f_m$ limits may be used. An initial condition of 512 MHz (which roughly corresponds to one foot range resolution, ignoring the benefit of processing the PN code chip length) may be initially used in the method.

If the average of the consecutive chip SNR value is greater than $T^+$ then the code modulation frequency may be adjusted to the following frequency:

$$f_m^{i+1} = f_m^i + \left| \frac{f_m^i - f_m^{i-1}}{2} \right|$$

If the average of the consecutive chip SNR value is less than $T^-$ then the frequency may be adjusted to the following frequency:

$$f_m^{i+1} = f_m^i - \left| \frac{f_m^i - f_m^{i-1}}{2} \right|$$

It will be appreciated that $f_m^i$ is the current $f_m$ value, $f_m^{i-1}$ is the previous $f_m$ value, and $f_m^{i+1}$ is the next $f_m$ value.

As shown in FIG. 3, modulation frequency is adjusted first. Once the frequency reaches a minimum value (1 MHz) or a maximum value (1024 MHz), then the chip length is adjusted. The initial chip length may be set to a 32 bit chip length.

The equation governing range resolution is given by:

$$\Delta R = \frac{\alpha}{f_m \sqrt{N_{bits}}} e^{-\beta \cdot SNR}$$

The adjustment to the chip length (number of bits) may be the same as the moving average adjustment of frequency, described above.

The inventor has discovered that it is preferable to adjust the frequency of modulation first, and then next the chip length. The reason the frequency is preferably adjusted first is because the frequency adjustment may act as a coarse adjustment and the chip length adjustment may act as a fine adjustment.

The table below shows combinations of extreme conditions and a description of conditions that may lead to these extreme combinations. The SNR may continue to be measured and adjustments may be made, in accordance with the method shown in FIG. 3, when warranted.

| Description | $f_m$ | Chip length |
|---|---|---|
| Low power, cooperating target | Min | Min |
| Maximum acquisition range | Min | Max |
| High velocity, fast response | Max | Min |
| Highest range resolution | Max | Max |

The method of the invention advantageously balances the probability of detecting the laser pulse (Pd), the signal-to-noise ratio (SNR) of a pulse, and the false alarm rate (FAR) of the system. In addition, the processing is tolerant of dynamic SNR due to temporal changes in surface reflectivity properties (glint, fade, drop out) resulting from viewing angle dynamics and changing range.

Figure 6:
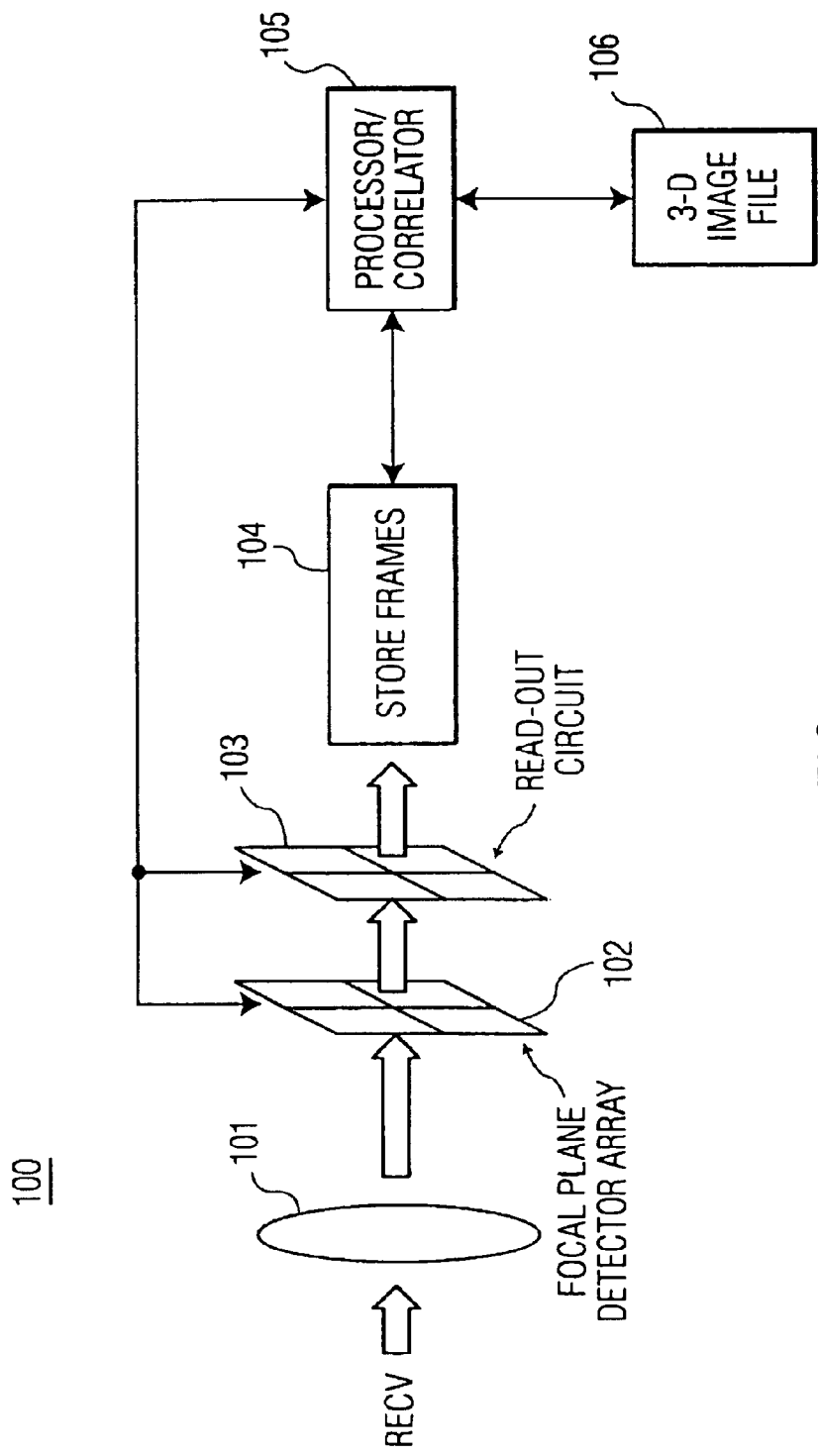
FIG. 6 is a block diagram of a receiver portion of a ladar system for obtaining a three dimensional (3-D) image of a target, in accordance with an embodiment of the invention.

Referring last to FIG. 6, there is shown a block diagram of a receiver of a ladar system, generally designated 100. As shown, receiver 100 includes optics 101, focal plane detector array (FPA) 102, read-out integrated circuit (ROIC) 103, frame store 104, processor/correlator 105 and 3-D image file 106. FPA 102 includes an array of pixels, for example, 256×256 pixels, and ROIC 103 includes a unit cell for each corresponding pixel of FPA 102 for reading the image signal sensed by its corresponding pixel. The image signals sensed by FPA 102 are digitized and stored as frames in frame store 104. The image signal sensed by each pixel includes the received PN code. This received PN code is auto correlated with the PN code modulation in processor/correlator 105 to obtain range (or time delay) between a point on the target and a respective pixel. By measuring relative time delays between the received signal of one pixel and the received signal of another pixel, depth dimension of the target may be obtained. The depth dimension of the target corresponding to each pixel in the array may be stored in 3-D image file 106.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A radar system for acquiring a target comprising:
   a waveform generator for generating a programmable pseudo-noise (PN) code of a variable code modulation frequency and a variable chip length,
   a transmitter for transmitting a continuous wave (CW) radar signal modulated in accordance with the programmable PN code,
   a receiver adapted to receive a radar return based on the transmitted radar signal, and
   a processor for processing the received radar return and acquiring the target, such processor including
   a first tuning control signal provided to the waveform generator for adjusting the code modulation frequency, and
   a second tuning control signal provided to the waveform generator for adjusting the chip length,
   wherein the waveform generator adjusts the code modulation frequency and the chip length, in response to the first and second tuning control signals, to optimize target acquisition.

2. The radar system of claim 1 wherein the first and second tuning control signals are varied in real time, as the receiver receives the radar return.

3. The radar system of claim 1 wherein the transmitter includes a laser diode for transmitting a light signal, the light signal modulated in accordance with the programmable PN code, and
   the receiver includes optics for receiving the light signal.

4. The radar system of claim 1 wherein the chip length varies from a 32 bit sequence to a 1024 bit sequence, and
   the code modulation frequency varies from 1 MHz to 1024 MHz.

5. The radar system of claim 1 wherein the processor measures a signal to noise ratio (SNR) of the received radar return, and adjusts at least one of the first and second tuning control signals, if the SNR includes a value outside a threshold dead band range of values.

6. The radar system of claim 5 wherein the processor measures a SNR over a first predetermined number of consecutive chips of the received radar return, and adjusts the at least one of the first and second tuning control signals, and subsequently measures another SNR over a second predetermined number of consecutive chips of the received radar return, in which the second predetermined number of consecutive chips are adjusted by the at least one of the first and second tuning control signals, wherein the first and second predetermined number of consecutive chips occur at different time periods.

7. The radar system of claim 1 wherein the processor, during a first time period, provides the first tuning control signal to the waveform generator for adjusting the code modulation frequency, and during a second time period, provides the second tuning control signal to the waveform generator for adjusting the chip length, wherein the first time period occurs prior to the second time period.

8. A ladar system for acquiring an image of a target comprising:

a waveform generator for generating a programmable pseudo-noise (PN) code of a variable code modulation frequency and a variable chip length, an optical transmitter for transmitting a continuous wave (CW) laser signal modulated in accordance with the programmable PN code, an optical receiver adapted to receive an image of the target based on the transmitted laser signal, and a processor for processing the received image of the target, such processor including a first tuning control signal provided to the waveform generator for adjusting the code modulation frequency, and a second tuning control signal provided to the waveform generator for adjusting the chip length, wherein the waveform generator adjusts the code modulation frequency and the chip length, in response to the first and second tuning control signals, to optimize the received image of the target.

9. The ladar system of claim 8 wherein the first and second tuning control signals are varied in real time, as the optical receiver receives the image of the target.

10. The ladar system of claim 8 wherein the chip length varies from a 32 bit sequence to a 1024 bit sequence, and the code modulation frequency varies from 1 MHz to 1024 MHz.

11. The ladar system of claim 8 wherein the processor measures a signal to noise ratio (SNR) of the received image of the target, and adjusts at least one of the first and second tuning control signals, if the SNR includes a value outside a threshold dead band range of values.

12. The ladar system of claim 11 wherein the processor measures a SNR over a first predetermined number of consecutive chips of the received image of the target, and adjusts the at least one of the first and second tuning control signals, and subsequently measures another SNR over a second predetermined number of consecutive chips of the received image of the target, in which the second predetermined number of consecutive chips are adjusted by the at least one of the first and second tuning control signals, wherein the first and second predetermined number of consecutive chips occur at different time periods.

13. The ladar system of claim 8 wherein the processor, during a first time period, provides the first tuning control signal to the waveform generator for adjusting the code modulation frequency, and during a second time period, provides the second tuning control signal to the waveform generator for adjusting the chip length, wherein the first time period occurs prior to the second time period.

14. The ladar system of claim 8 wherein the optical receiver includes an avalanche photo diode (APD), operating in the linear mode, and having a two dimensional (2D) array of pixels for receiving the image of the target.

15. The ladar system of claim 14 wherein each pixel of the array includes one of a push broom and a starring system for processing the target into a three dimensional (3D) image.

16. A method of dynamically optimizing an acquisition range of a radar system, the method comprising the steps of:

(a) modulating a CW radar signal with a PN code including an adjustable code frequency of modulation and an adjustable chip length;

(b) transmitting the modulated radar signal;

(c) receiving a return radar signal based on the transmitted radar signal;

(d) continuously measuring a SNR of the received return radar signal; and (e) adaptively tuning the adjustable code frequency of modulation, and adaptively tuning the adjustable chip length, based on the continuously measured SNR; thereby optimizing the acquisition range of the radar system.

17. The method of claim 16 wherein step (e) includes adaptively tuning the adjustable code frequency of modulation during a first time period, and adaptively tuning the adjustable chip length during a second time period, in which the first time period occurs prior to the second time period.

18. The method of claim 16 wherein step (d) includes continuously measuring a SNR of each chip of the return radar signal, and averaging the SNR over a predetermined number of consecutive chips of the return radar signal.

19. The method of claim 16 in which step (e) includes adaptively tuning the adjustable code frequency of modulation based on the following relationship:

$$f_m^{i+1} = f_m^i \pm \left| \frac{f_m^i - f_m^{i-1}}{2} \right|$$

wherein $f_m^i$ is a frequency of modulation value during a currently received predetermined number of chips, $f_m^{i-1}$ is a frequency of modulation value during a previously received predetermined number of chips, and $f_m^{i+1}$ is a frequency of modulation value during a next received predetermined number of chips.

20. The method of claim 16 wherein step (e) includes iteratively, continuously reducing the code frequency of modulation in response to the continuously measured SNR, until the measured SNR is greater than a first threshold value.

21. The method of claim 20 including
(i) determining if the code frequency of modulation is at a minimum value, and
(ii) increasing the chip length, if the code frequency of modulation is at a minimum value.

22. The method of claim 16 wherein step (e) includes iteratively, continuously increasing the code frequency of modulation in response to the continuously measured SNR, until the measured SNR is less than a second threshold value.

23. The method of claim 22 including
(i) determining if the code frequency of modulation is at a maximum value, and
(ii) decreasing the chip length, if the code frequency of modulation is at a maximum value.

24. The method of claim 16 in which
step (a) includes modulating a CW laser signal with the PN code; and
step (c) includes receiving a return image based on the transmitted laser signal.

25. A ladar system for acquiring an image of a target comprising:
a waveform generator for generating a programmable pseudo-noise (PN) code of a variable code modulation frequency and a variable chip length, and
an optical transmitter for transmitting a laser signal modulated in accordance with the PN code,
an optical receiver including optical detectors for at least two pixels each adapted to receive an image signal of the target based on the transmitted laser signal, and
a processor for processing each received image signal, such processor measuring a relative delay time between each image signal, the processor including
a first tuning control signal provided to the waveform generator for adjusting the code modulation frequency, and
a second tuning control signal provided to the waveform generator for adjusting the chip length,
wherein the waveform generator adjusts the code modulation frequency and the chip length, in response to the first and second tuning control signals, to optimize acquisition of the image signal.

26. The system of claim 25 wherein the processor includes an autocorrelator for processing the received image signals.

27. The system of claim 25 wherein the measured delay time for each pixel is used to derive a depth dimension of the target.

28. The system of claim 27 wherein the depth dimension is used to enhance recognition of the target.

* * * * *